United States Patent [19]

Snelling, Jr.

[11] Patent Number: 5,826,257
[45] Date of Patent: Oct. 20, 1998

[54] METHOD AND STRUCTURE FOR MAINTAINING AND UTILIZING A LOOKUP VALUE ASSOCIATED WITH A STORED DATABASE VALUE

[75] Inventor: George Arthur Snelling, Jr., Seattle, Wash.

[73] Assignee: Microsoft Corporation, Redmond, Wash.

[21] Appl. No.: 619,129

[22] Filed: Mar. 20, 1996

[51] Int. Cl.⁶ .................................................. G06F 17/30
[52] U.S. Cl. .................................. 707/4; 707/3; 345/156; 345/326; 345/340; 345/347
[58] Field of Search .............................. 395/604; 707/4, 707/3; 345/156, 326, 340, 347

[56] References Cited

U.S. PATENT DOCUMENTS

| | | | |
|---|---|---|---|
| 5,499,359 | 3/1996 | Vijaykumar | 395/600 |
| 5,553,218 | 9/1996 | Li et al. | 395/148 |
| 5,561,793 | 10/1996 | Bennet et al. | 395/600 |
| 5,566,330 | 10/1996 | Sheffield | 395/604 |
| 5,603,025 | 2/1997 | Tabb et al. | 395/602 |
| 5,615,367 | 3/1997 | Bennet et al. | 395/613 |
| 5,619,688 | 4/1997 | Bosworth et al. | 395/604 |

OTHER PUBLICATIONS

Karen Bowman and Kamali Abelson, Quest User's Guide, Gupta Tech, Inc., 1991, Chap. 4 "Creating and Opening Tables," pp. 54–68, Jan. 1991.

Karen Bowman and Kamali Abelson Quest User's Guide Gupta Tech., Inc., 1991, Chap. 5 "Editing table's," pp. 70–84, pp. 286–303 Chap. 17, Jan. 1991.

Karen Bowman and Kamali Abelson, Quest User's Guide Gupta Tech Chap. 6 "Querying tables," pp. 92–114, pp. 226–283 Chap. 16, Jan. 1991.

Karen Bowman and Kamali Abelson, Quest User's Guide Gupta Technologies, Inc., pp. 136–149, Chap. 8, pp. 174–182 Chap. 12, Jan. 1991.

*Primary Examiner*—Wayne Amsbury
*Assistant Examiner*—Jean M. Corrielus
*Attorney, Agent, or Firm*—Duft, Graziano & Forest, PC

[57] ABSTRACT

A method and associated data structures for generating, maintaining, and applying "display parameters" as a portion of lookup information associated with a column in a database table. Display parameters provides for the display and retrieval of alternate values in place of the data stored in the associated column. Use of such alternate values permit the application database designer to provide more meaningful presentation of data to a user while permitting the storage of corresponding data to be optimized for storage or performance criteria. The display parameters are a portion of the lookup information associated with a column of a database table and are stored in the data dictionary of the application database. Storing the display parameters in the data dictionary permits all access to the associated column data to automatically utilize the alternate values for any data display or retrieval without further design considerations unique to the particular database access. The display parameters may comprise a static table consisting of rows (or a list) of entries. Each includes at least one alternate value for the stored value. A plurality of columns may be provided in each row to provide other alternate values useful by other column data access operations. The display parameters may alternatively comprise a second table identification and an associated query command. The second table is joined with the first table (containing the lookup associated column) by a relation. The associated query command is applied to the join to extract a table of alternate values used in accessing the associated column.

38 Claims, 14 Drawing Sheets

FIG. 7

| TABLE 1 : TABLE | | |
|---|---|---|
| FIELD NAME | DATA TYPE | DESCRIPTION |
| NewField | TEXT ▽ | Newly created filed to demonstrate Lookup Fields |
| | TEXT | |
| | MEMO | |
| | NUMBER | |
| | DATE/TIME | |
| | CURRENCY | |
| | AUTONUMBER | |
| | YES/NO | |
| | OLE OBJECT | |
| | LOOKUP WIZARD | |

700, 702, 704, 706, 708

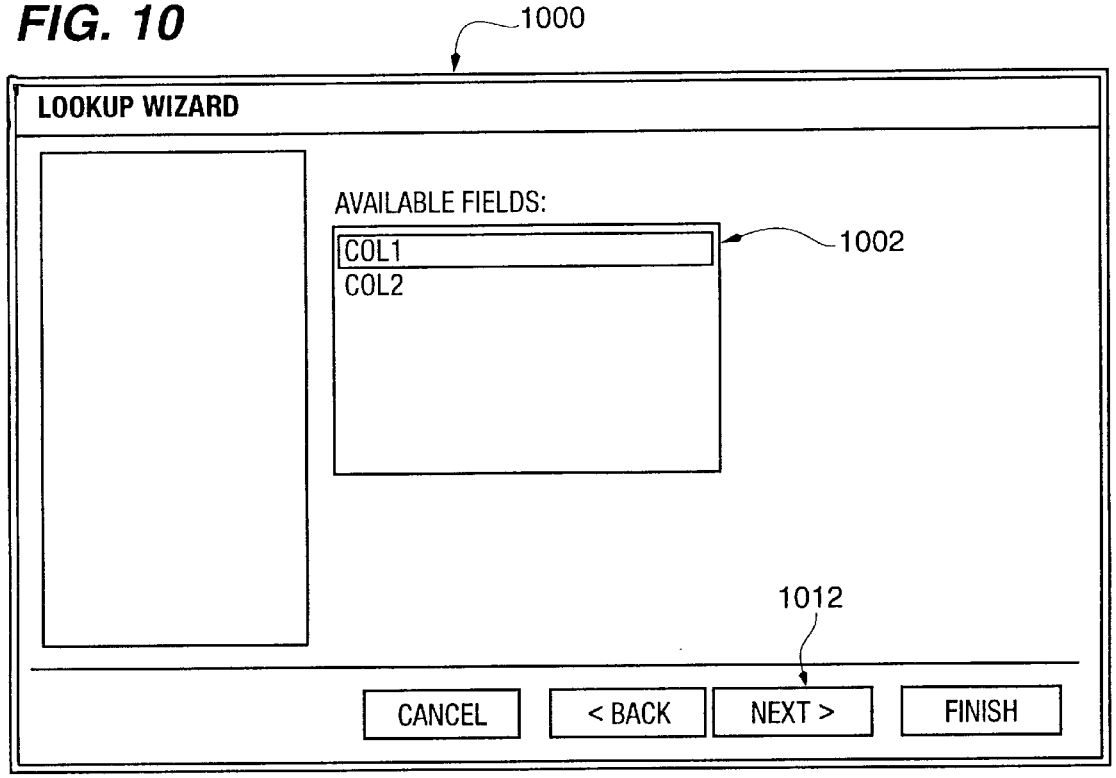

FIG. 11

| TABLE 1 : TABLE | | |
|---|---|---|
| FIELD NAME | DATA TYPE | DESCRIPTION |
| ▷ NewField | Text | Newly created filed to demonstrate Lookup Fields |

1100

FIELD PROPERTIES

| GENERAL | LOOKUP | |
|---|---|---|
| DISPLAY CONTROL | | COMBO BOX |
| ROW SOURCE TYPE | | VALUE LIST |
| ROW SOURCE | | "JOHN SMITH","ACME DISTRIBUTORS" |
| BOUND COLUMN | | 1 |
| COLUMN COUNT | | 2 |
| COLUMN HEADS | | NO |
| COLUMN WIDTHS | | 1", 1.9334" |
| LIST ROWS | | 6 |
| LIST WIDTH | | 2.9333" |
| LIMIT TO LIST | | NO |

1102

A FIELD NAME CAN BE UP TO 64 CHARACTERS LONG, INCLUDING SPACES.
PRESS F1 FOR HELP ON FIELD NAMES

FIG. 14

LOOKUP WIZARD

| COMPANYNAME | CONTACTNAME |
|---|---|
| ALFREDS FUTTEKISTE | MARIA ANDERS |
| ANA TRUJILLO EMPAREDADOS Y HALADOS | ANA TRUJILLO |
| ANTONIO MORENA TAQUERIA | ANTONIO MORENA |
| AROUND THE HORN | THOMAS HARDY |
| BERGLUNDS SNABBKOP | CHRISTINA BERGLUND |
| BLAUER SEE DELIKATESSEN | HANNA MOOS |
| BIONDEL PEPE ET FILS | FREDERIQUE CITEAUX |

[ CANCEL ]  [ < BACK ]  [ NEXT > ]  [ FINISH ]

LOOKUP WIZARD

AVAILABLE FIELDS: — 1504

| CUSTOMER ID |
| COMPANY NAME |
| CONTACT NAME |

— 1502

1512

[ CANCEL ]  [ < BACK ]  [ NEXT > ]  [ FINISH ]

FIG. 16

TABLE 1 : TABLE — 1600

| FIELD NAME | DATA TYPE | DESCRIPTION |
|---|---|---|
| OrderID | AutoNumber | Unique order number |
| CustomerID | Text | Same entry as in Customer's table |
| EmplyeeID | Number | Same entry as in Employee's table |
| OrderDate | Date/Time | |
| RequiredDate | Date/Time | |
| ShippedDate | Date/Time | |
| ShipVia | Number | Same as Shipper ID in Shipper's table |
| Freight | Currency | |
| ShipName | Text | Name of person or company to receive shipment |
| ShipAddress | Text | Street address only-no post-office box allowed |
| ShipCity | Text | |
| ShipRegion | Text | State or provence |
| ShipPostalCode | Text | |

FIELD PROPERTIES

SOURCE OF CONTROL'S DATA

GENERAL | LOOKUP — 1602

| | |
|---|---|
| DISPLAY CONTROL | COMBO BOX |
| ROW SOURCE TYPE | TABLE/QUERY |
| ROW SOURCE | SELECT DISTINCTROW[CUSTOMER ▽ |
| BOUND COLUMN | 1 |
| COLUMN COUNT | 3 |
| COLUMN HEADS | NO |
| COLUMN WIDTHS | 0",2.05",1.575" |
| LIST ROWS | 6 |
| LIST WIDTH | 3.625" |
| LIMIT TO LIST | YES |

FIG. 17

*CUSTOMER ORDER DATABASE*

| ORDER ID | CUSTOMER | EMPLOYEE | ORDER DATE | REQUIRED DATE | SHIPPED |
|---|---|---|---|---|---|
| 10248 | Vins et alcools Chevalier | Buchanan, Steven | 01-Jul-93 | 29-Jul-93 | 13-Ju |
| 10249 | Victuailles en stock | Mary Saveley | 02-Jul-93 | 13-Aug-93 | 07-Ju |
| 10250 | Vins et alcools Chevalier | Paul Henriot | 05-Jul-93 | 02-Aug-93 | 09-Ju |
| 10251 | Die Wandernde Kuh | Rita Muller | 05-Jul-93 | 02-Aug-93 | 12-Ju |
| 10252 | Wartian Herkku | Pirkko Koskitalo | 06-Jul-93 | 03-Aug-93 | 08-Ju |
| 10253 | Wellington Importadora | Paula Parente | 07-Jul-93 | 21-Jul-93 | 13-Ju |
| 10254 | White Clover Markets | Karl Jablonski | 08-Jul-93 | 05-Aug-93 | 20-Ju |
| 10255 | Wilman Kala | Matti Karttunen | 09-Jul-93 | 06-Aug-93 | 12-Ju |
| 10256 | Wolski Zajazd | Zbyszek Piestrzeniewski | 12-Jul-93 | 09-Aug-93 | 14-Ju |
| 10257 | HILARIÓN-Abastos | Peacock, Margaret | 13-Jul-93 | 10-Aug-93 | 19-Ju |
| 10258 | Ernst Handel | Davolio, Nancy | 14-Jul-93 | 11-Aug-93 | 20-Ju |
| 10259 | Centro comercial Moctezuma | Peacock, Margaret | 15-Jul-93 | 12-Aug-93 | 22-Ju |

RECORD 1 OF 830

FIG. 18

CUSTOMER ORDER DATABASE

| ORDER ID | CUSTOMER | EMPLOYEE | ORDER DATE | REQUIRED DATE | SHIPPED |
|---|---|---|---|---|---|
| 10248 | VINET | 5 | 01-Jul-93 | 29-Jul-93 | 13-Jl |
| 10249 | TOMSP | 1 | 02-Jul-93 | 13-Aug-93 | 07-Jl |
| 10250 | HANAR | 4 | 05-Jul-93 | 02-Aug-93 | 09-Jl |
| 10251 | VICTE | 3 | 05-Jul-93 | 02-Aug-93 | 12-Jl |
| 10252 | SUPRD | 4 | 06-Jul-93 | 03-Aug-93 | 08-Jl |
| 10253 | HANAR | 3 | 07-Jul-93 | 21-Jul-93 | 13-Jl |
| 10254 | CHOPS | 5 | 08-Jul-93 | 05-Aug-93 | 20-Jl |
| 10255 | RICSU | 9 | 09-Jul-93 | 06-Aug-93 | 12-Jl |
| 10256 | WELLI | 3 | 12-Jul-93 | 09-Aug-93 | 14-Jl |
| 10257 | HILAA | 4 | 13-Jul-93 | 10-Aug-93 | 19-Jl |
| 10258 | ERNSH | 1 | 14-Jul-93 | 11-Aug-93 | 20-Jl |
| 10259 | CENTC | 4 | 15-Jul-93 | 12-Aug-93 | 22-Jl |

RECORD 1 OF 830

FIG. 19

CUSTOMER ORDER DATABASE

| ORDER ID | CUSTOMER | EMPLOYEE | ORDER DATE | REQUIRED DATE | SHIPPED |
|---|---|---|---|---|---|
| 10248 | Vins et alcools Chevalier | Buchanan, Steven | 01-Jul-93 | 29-Jul-93 | 13-Ju |
| 10249 | Toms Spezialitäten | Suyama, Michael | 02-Jul-93 | 13-Aug-93 | 07-Ju |
| 10250 | Hanari Carne | Peacock, Margaret | 05-Jul-93 | 02-Aug-93 | 09-Ju |
| 10251 | Victuailles en stock | Leverling, Janet | 05-Jul-93 | 02-Aug-93 | 12-Ju |
| 10252 | Suprêmes délices | Peacock, Margaret | 06-Jul-93 | 03-Aug-93 | 08-Ju |
| 10253 | Hanari Carnes | Leverling, Janet | 07-Jul-93 | 21-Jul-93 | 13-Ju |
| 10254 | Chop-suey Chinese | Buchanan, Steven | 08-Jul-93 | 05-Aug-93 | 20-Ju |
| 10255 | Richter Supermarkt | Dodsworth, Anne | 09-Jul-93 | 06-Aug-93 | 12-Ju |
| 10256 | Wellington Importadora | Leverling, Janet | 12-Jul-93 | 09-Aug-93 | 14-Ju |
| 10257 | HILARIÓN-Abastos | Peacock, Margaret | 13-Jul-93 | 10-Aug-93 | 19-Ju |
| 10258 | Ernst Handel | Davolio, Nancy | 14-Jul-93 | 11-Aug-93 | 20-Ju |
| 10259 | Centro comercial Moctezuma | Peacock, Margaret | 15-Jul-93 | 12-Aug-93 | 22-Ju |

RECORD 1 OF 830

METHOD AND STRUCTURE FOR MAINTAINING AND UTILIZING A LOOKUP VALUE ASSOCIATED WITH A STORED DATABASE VALUE

FIELD OF THE INVENTION

The present invention relates to presentation and display of data in a database management system and in particular to methods and associated structures for defining and maintaining display parameters of lookup fields stored in association with a table in a database to provide alternate display and presentation parameters for a corresponding field of the database table.

Problem

Database management systems are commonly used to structure stored data in computing systems to provide easy, rapid, and flexible access to the stored data. Most database management systems provide tools for creation of display or report templates (forms) which permit logical presentation of the data in user friendly form rather than the form in which the data is physically stored in the database management system. For example, it is common that the stored data is highly normalized so as to reduce duplication of stored data by storing attributes related by a common key value in a table having the common key value as a primary index field. This normalized form is often less meaningful to users than other preferred data entry display forms or report templates which organize and present the data in a manner more meaningful to a user.

For example, attributes of a particular supplier in an order entry database application may be associated with a unique supplier ID value in a supplier information database table. The supplier ID value (column) is the primary key in the supplier database table and a foreign key in other tables which may refer to a particular supplier in reference to a particular order transaction. In displaying or reporting information regarding the order transactions it is typically preferred to display or report the supplier field value by use of textual information in the supplier database table rather than the supplier ID value stored in an order/transaction database table. A supplier ID value is usually of less value to a user than is, for example, a supplier name or supplier representative.

Prior data base management systems address this problem by permitting the application database designer to create data entry forms or report templates that join any database tables required to display or report a column value using a related column value from another table. As in the example presented above, a database application designer may generate a form or report used with the order/transaction database table which joins the supplier information table through the common supplier ID key value in both tables. In this manner the form or report may utilize the textual supplier information associated with the unique supplier ID key field value. Such join and relation information associated with a column of a table may be referred to as reference information or reference properties. Furthermore, such reference properties of a column are frequently stored in a data dictionary associated with the tables of the database.

Columns from such related tables may be more useful or meaningful for presentation of data to a user. Though prior solutions permit the database designer to associate the related fields with a column of a table, display of the alternate value for presentation to the user is left as a task for the designer in the creation and maintenance of each form or report in the database application. In other words, the display or other presentation of the alternate values requires duplicative design efforts by a design engineer in each form or report in the database application. Parameters which control the display and presentation of the alternate values may include, for example, the width of columns of alternate values to be displayed in a pull-down menu, the number of such columns in a pull-down menu of alternate values, the number of rows of such alternate values, whether the user may enter data in a field outside the range of alternate values listed in the pull-down menu, etc. These and other display parameters for the alternate values are associated with each form or report of the database application. Duplication of the designer's efforts to generate and maintain the display information related to a lookup column is wasteful and leads to inconsistent presentation of data to a user of the database application.

It is clear from the above discussion that a need exists for an improved method and structure for generating and maintaining display related lookup data which identifies alternate database table fields or values to be used in forms or reports for presentation of date stored in a database table to a user and the parameters associated with the display or presentation of the alternate values to a user.

Solution

The present invention solves the above and other problems, thereby advancing the state of the useful arts, by providing methods and associated data structures for generating and maintaining display parameters associated with lookup data of a column in a database table. The display parameters are stored in the data dictionary of a database application with other data and lookup data used to access or modify the contents of a table and to relate the contents of a table with other tables. As used herein, "lookup information" refers to a lookup field data structure associated with a column of a database table which defines alternate values to be used by, for example, forms or reports which utilize the corresponding column. In particular as used herein, lookup information includes a portion referred to as "display parameters" which identify parameters used in the display or presentation of alternate values to a user. The methods of the present invention generate and maintain display parameters for a lookup field data structure associated with each column definition of a table in the database application and store the lookup field data structure in the data dictionary of the database application. The "data dictionary" of a database application, as used herein, refers to that portion of a database application in which is stored information and attributes describing the tables of the database application and the columns thereof. Unlike prior solutions which store such display parameters of lookup information in a duplicative fashion in each report or form which utilizes a particular column of a database table, the methods and data structures of the present invention store the display parameters in the data dictionary of the database application. Storing the display parameters in the data dictionary reduces the duplicate generation and storage of such information in each form or report and makes the information globally available to all reports and forms automatically. Global access to display parameters along with the associated lookup information permits a database designer to more easily provide a consistent presentation of data to a user. The display parameters stored in the data dictionary are automatically applied to all forms and reports using the associated database table column. In fact, all access to a column of a database table for which lookup information has been defined will automatically utilize the display parameters in the presentation of the columns data to a user.

A display parameters portion of the lookup information data structure is generated by the methods of the present invention and is associated with each column of each table of a database application. In the description that follows, the term "lookup information" is used to refer to the lookup information data structures which include the specific display parameters generated and maintained by the methods of the present invention. The terms "lookup information" (a data structure describing alternate values to be associated with a lookup column of a database table) and "display parameters" (a subset of the lookup information data structure) are used essentially as synonyms herein to refer to the data generated, stored, and maintained by the methods of the present invention.

The lookup information (including display parameters) is stored in the data dictionary along with other attributes and parameters of each column of each table of the database application. Lookup information associated with a field of a database table includes information which provides for displaying the value of the field in a form derived from a lookup translation entry. The lookup translation entry may specify a query to select appropriate presentation values from another table in the application database (e.g., a table joined to the table of the column to be presented by a common key value), or may be a static table entered by the application designer and comprising an entry associated with each possible value of the column to be presented. The lookup information (including the static table if any) is then stored in the data dictionary of the application database in association with other parameters and attributes of the column to be presented.

The lookup information is automatically utilized in any form, report, or other database access which presents the data of the associated column to a user. Such presentation of data may include graphical as well as textual format display of the data. The methods and structures of the present invention permit a database designer to easily provide a consistent, user friendly, presentation of information to a database user.

In one embodiment of the present invention, the lookup information may provide for a plurality of columns of data which may be utilized interchangeably in the presentation of data to a user. A first column may be the preferred mode of presenting the data to a user while other columns may map the stored value to other forms of presentation more acceptable to other database user applications. For example, one user (through a form or report) may prefer to be presented with a supplier ID in the form of a supplier name while another user may prefer viewing the supplier ID in the form of a supplier representative or contact name. Each of these modes of presentation of a column of data may be specified and supported by the methods and structures of the present invention. The lookup translation entry of the present invention permits the application database designer to specify that a table of alternate presentation values be comprised of a plurality of columns. When the user selects the column for access (such as for modification of the field), the user is presented with a plurality of alternate, equivalent columns of values.

Yet another embodiment of the present invention permits the database application designer to designate one of a plurality of alternate presentation values as the value to be stored in the associated column of the database table. The column of the lookup translation entry which contains the designated value for storage is referred to herein as the "bound column." Designating the bound column permits the application database designer to assure consistency in the type and format of the values stored in the associated database table column.

BRIEF DESCRIPTION OF THE DRAWINGS

FIGS. 7–19 are exemplary computer display screen images which aid in understanding the operation of the methods of the present invention to generate, maintain, and utilize lookup values in association with the exemplary database schema of FIG. 6.

DETAILED DESCRIPTION OF THE INVENTION

Computing Environment Overview

Figure 1:
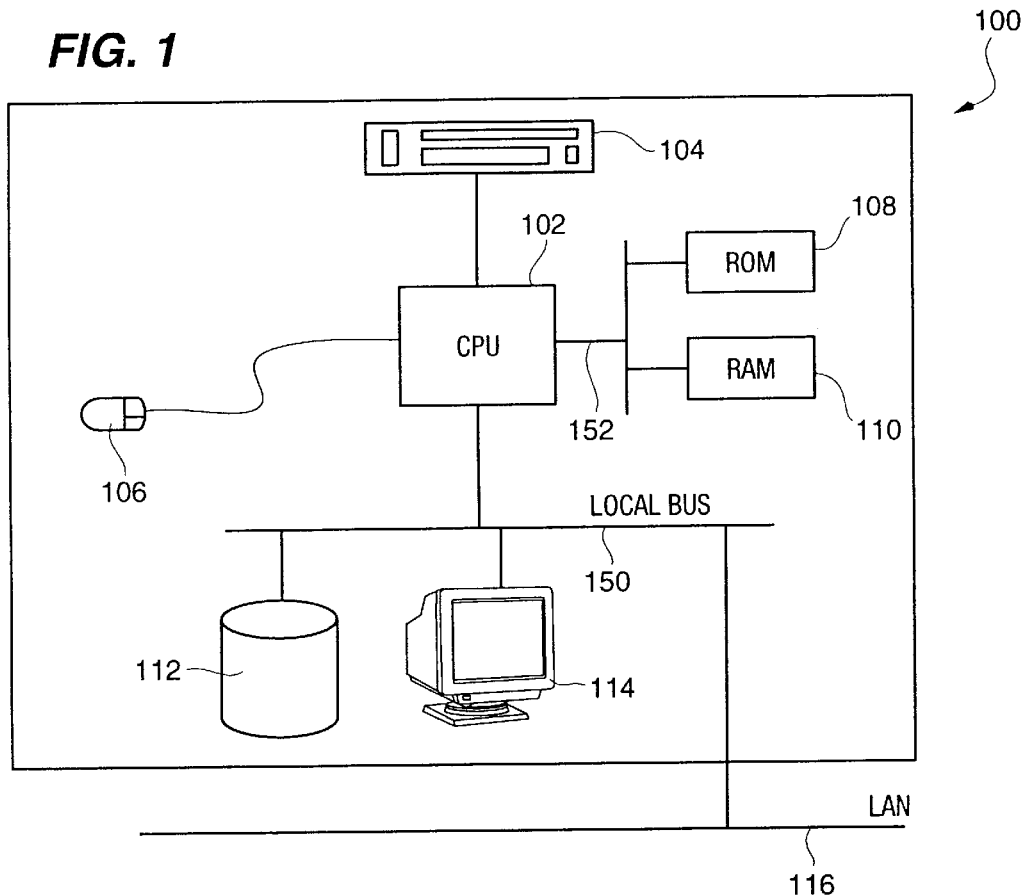
FIG. 1 is a block diagram of a typical computing environment in which the methods and structures of the present invention may be advantageously applied.

The methods of the present invention are useable in any of several standard computing systems generally available in the industry. FIG. 1 depicts a typical computing system 100 in which the methods and structures of the present invention may be advantageously applied. The methods of the present invention are performed by execution of programmed instructions within the CPU 102. CPU 102 stores and/or retrieves programmed instructions and/or data from ROM 108 and RAM 110 via memory bus 152. The methods of the present invention operable within CPU 102 receive user input via keyboard 104 and pointing device 106. Various peripheral I/O devices are attached to CPU 102 via local bus 150. Specifically, mass storage device 112 (i.e., disk storage devices), graphical display 114, and local area network (LAN) 116 are all attached to CPU 102 via local bus 150.

The methods of the present invention operable within CPU 102 manipulate information in a database stored within mass storage device 112 and display resultant information on graphical display 114. Designer input directing the methods of the present invention to select particular cells (rows and columns) of the database table are received via keyboard 104 and pointing device 106. One of ordinary skill in the art will readily recognize that the methods of the present invention are equally applicable where, for example, a database being manipulated is stored remotely and is accessible via LAN 116 using well known distributed computing and network communication techniques. More generally, one of ordinary skill in the art will readily recognize that LAN 116 may represent any computer network communication subsystem in which a database may be remotely accessed by another computer. Similarly, designer input obtained via pointing device 106 or keyboard 104 may be similarly generated by other user input devices and techniques such as so-called pop-up or pull-down menu graphical user interface operations.

Exemplary Database

Figure 6:
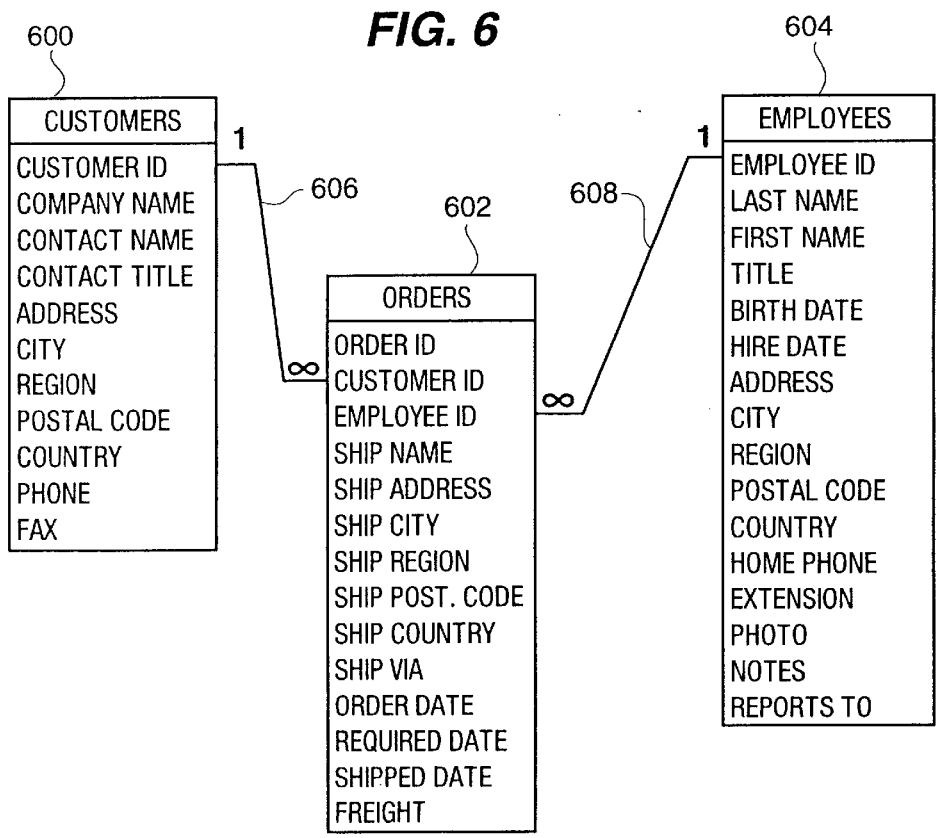
FIG. 6 is a graphical representation of a schema for an exemplary database on which the methods of the present invention may operate to generate, maintain, and utilize lookup values.

FIG. 6 graphically describes the schema of an exemplary order processing application database useful in the descriptions to follow of the methods and structures of the present invention. It will be recognized that the database schema described graphically in FIG. 6 is but one example of an application database in which the methods and structures of the present invention may be advantageously applied. An infinite number of similar database applications may be envisioned which may also utilize the methods and structures of the present invention. Furthermore, one of ordinary skill in the art will readily recognize that the exemplary application database depicted in FIG. 6 is but a portion of a larger application. Only that portion which is useful for the description of the methods and structures of the present invention has been included in FIG. 6.

The order processing application database of FIG. 6 comprises three tables, namely: customers table 600, orders table 602, and employees table 604. The customers 600 table includes all detailed information regarding a particular customer. A primary key identified as customer ID is used to provide a unique identification code for each customer. Associated with each unique customer ID in the customers table 600 is the remaining detail including the company name of the customer, the contact name of the customer, address, etc. Similarly the employees table 604 contains rows describing each employee of the vendor utilizing the order processing application database. An employee ID primary key is used to uniquely identify each record in the employees table 604. Associated with each unique employee ID in a record (row of the employees table 604 is remaining detail describing the employee including, last name, first name, title, address, etc.

The orders table 602 describes all detail of a particular order placed with the vendor by a specific customer through a specific employee. Each row in the orders table 602 includes a primary key named order ID to uniquely identify each record. Associated with each unique record identified by the order ID is the remaining detail describing the particular order transaction placed by the customer with the employee. In particular, a customer ID field in each order table 602 record is utilized as a foreign key to provide a relation with the customers table 600. In addition, an employee ID field in each orders table 602 record is used as a foreign key to provide a relation with employees table 604. The one to many relationship between the customers table 600 and the orders table 602 is identified in FIG. 6 by reference number 606. The one to many relationship between the employees table 604 and the orders table 602 is identified in FIG. 6 by reference number 608. Relationship 606 is established between the customers table 600 and the orders table 602 by the common key value customer ID. Likewise, the relationship 608 between the employees table 604 and the orders table 606 is established by the common key field employee ID. One of ordinary skill in the art will readily recognize that a complete order processing application database will include many other tables and relations to identify particular details of a particular order. For purposes of the discussion to follow, the three tables depicted and the relations depicted suffice for purposes of describing the methods and structures of the present invention.

As noted above, for purposes of optimizing storage space within the database application, the unique customer ID field may be encoded in the form of a short textual field or numeric value. Similarly, the employee ID key field may be encoded in a numeric form or other short textual format. Encoding of such key values in an abbreviated storage format permits significant reduction in storage capacity required for any duplication of data in the normalization of the application database. However, as is known in the art, such abbreviated encodings of identification fields may be less useful in presentation of information to users of the application database as compared to full textual representations such as company name, contact name, or employee first or last names.

FIG. 18 is an exemplary computer display screen image depicting the orders table 602 in a tabular format. In the exemplary screen display of FIG. 18, the customer column 1800 and the employee column 1802 are displayed utilizing the corresponding fields of the orders table 602 as stored in the application database. Specifically, the customer column 1800 is displayed using the abbreviated storage format of the customer ID field of the orders table 602. Similarly, the employee column 1802 is displayed utilizing the abbreviated employee ID field of the orders table 602. FIG. 19 is an exemplary computer screen display showing the orders table 602 with the customer column 1900 and the employee column 1902 displayed in a more readable format by application of the methods and structures of the present invention. In particular, the customer column 1900 is displayed using the company name field of the customers table 600 from the record corresponding to the customer ID key field stored in the record of the orders table 602. In other words, the customer ID field value in the first entry of the orders table 602 as shown in FIG. 18 contains the value "VINET" which corresponds to the company name field value in the customers table 600 of "Vins et alcools Chevalier." Similarly, the employee column 1902 of FIG. 19 displays the full textual last and first name of the employee whose employee ID value is equal to the value stored as depicted in the employee column 1802 of FIG. 18. In particular, for example, employee ID number 5 as shown in the first row of the orders table 602 in FIG. 18 is displayed in FIG. 19 using the full textual last name and first name of the employee shown as "Buchanan, Steven." Utilizing the methods and structures of the present invention, described below in further detail, all access to the data stored in tables of the application database as shown in FIG. 18 may be displayed or otherwise accessed utilizing alternate values extracted from tables of the application database or from other sources as discussed below in further detail. One of ordinary skill in the art will readily recognize that the mode of access depicted in FIG. 19, specifically that of displaying table contents in a tabular format, is but one form of access in which the methods and structures of the present invention may be applied in translation of the data format from a stored format to a more useable format. As is discussed below in further detail, the methods of the present invention are applicable to all forms and modes of access to data in an application database.

Methods of the Present Invention—Lookup Definition

Figure 2:
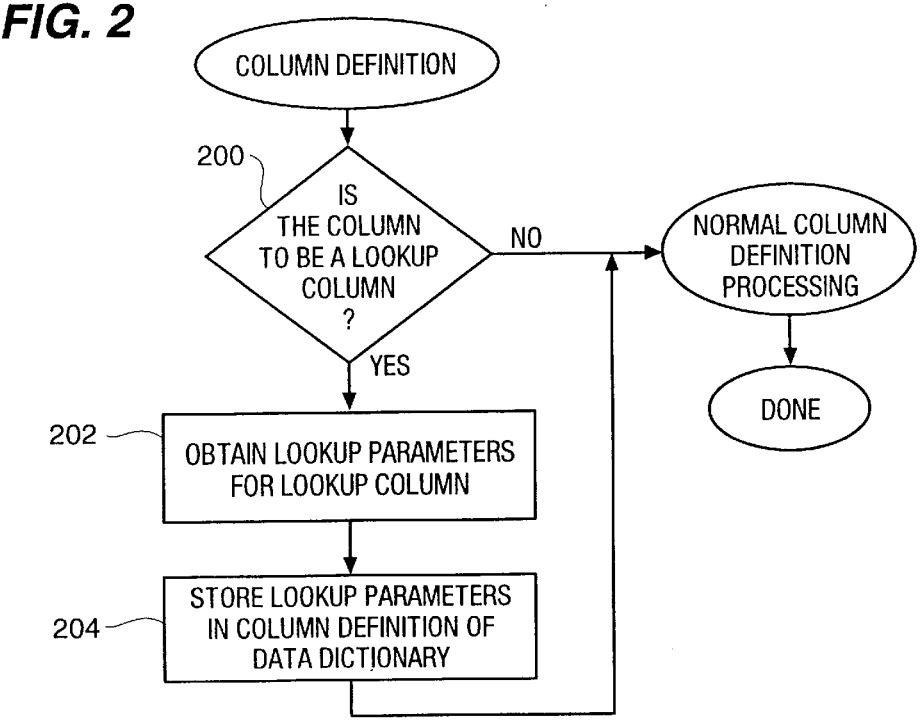
FIGS. 2–5 are flowcharts describing the operation of the methods of the present invention for generating, maintaining, and utilizing lookup values in association with an application database.

FIG. 2 is a flowchart describing the operation of methods of the present invention applicable when a column of a database table is being initially defined by the application database designer. The method depicted in FIG. 2 is operable as a portion of processing by a database designer to define a new column to determine whether the newly defined column is to be defined as a lookup column. As used herein, a "lookup column" is a column of a database table with which is associated lookup information as discussed below. A lookup column may also be referred to herein as a "lookup field."

Element 200 is first operable to determine whether the designer desires that the newly defined column be designated a lookup column. If element 200 determines that the newly defined column is not to be defined as a lookup column, then processing continues with completion of the normal definition processing for creation of a column. If the newly defined column is to have lookup information associated therewith, as determined by operation of element 200, element 202 is then operable to obtain from the designer of the application database all parameters and information regarding the lookup column definition. The lookup parameters and information are discussed below in additional detail and includes all information required to identify alternate values to be associated with access to data stored in the column presently being defined. Element 204 is next operable to store the lookup parameters and information in the data dictionary of the application database along with all standard definition parameters of the new column. As is well known in the art, a data dictionary is associated with the application database to store all information describing characteristics, attributes, and parameters of columns of tables in the application database. Additionally, the data dictionary may be a central repository for storing all related forms, and reports associated with the database application. Processing then continues to complete all required processing associated with the normal definition of a column in a table of the application database. As discussed in additional detail below, storing the lookup information in the data dictionary of the application database makes the information readily available for all forms of access to the data stored in the lookup column of the database table. This permits the designer to more easily and uniformly present data in a database table to the user in a more usable manner as compared to prior methods.

As will be discussed below in additional detail, a lookup column may be defined as one of two types, namely: a "static table" or a "select table." A static table lookup column is associated with a static list of values entered by the database designer to be used as alternate values in any access to data in the associated lookup column. A select table lookup column is associated with a second database table (a related table) and a select or query command to be performed upon the second table for purposes of retrieving a resultant table of alternate values used for access to data stored in the lookup column.

Definition of Alternate Value, Alternate Display Value

Figure 4:
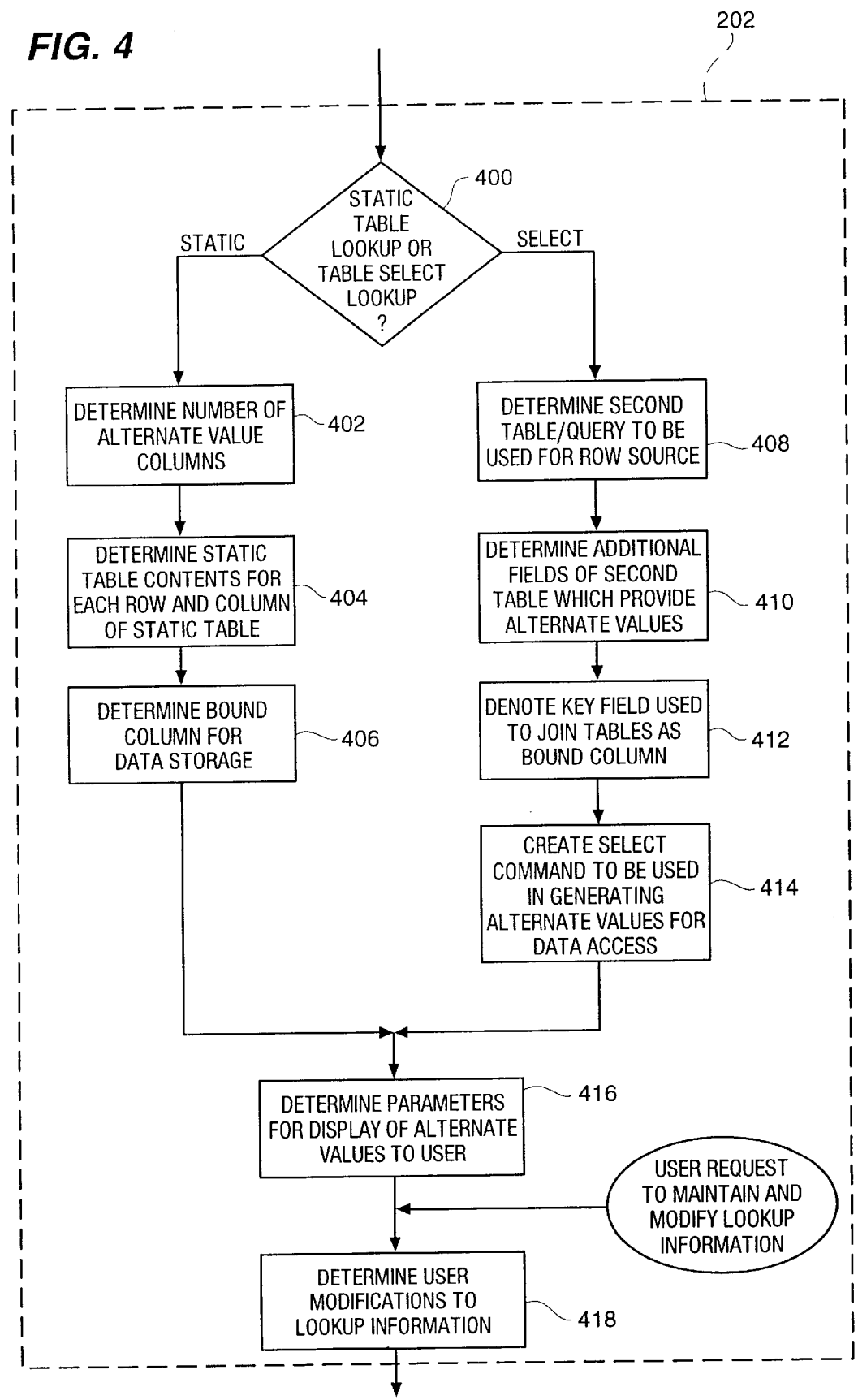

FIG. 4 in conjunction with exemplary screen displays in FIGS. 7–11 describes the process of defining a lookup column associated with a static table by a database designer. The flowchart of FIG. 4 in conjunction with exemplary screen displays 12–18 describes the process of defining a lookup column in association with a select table (a select or query command applied to and associated related table of the application database). FIG. 4 is a flowchart describing additional details of the operation of element 202 of FIG. 2.

FIG. 7 is an exemplary computer display screen image depicting one mode of user interaction which invokes the method of FIG. 4 to define a lookup column in a table. As shown in FIG. 7, table 700 (entitled Table 1) is shown in a design mode in which the designer may enter the fields (columns) to be defined in the new table 700. The designer enters the name of the new field (column) in the field name column 704 of the design mode display. Similarly, the designer enters the type of data in the data type 706 column of the design display. In the data type column 706, a pull down menu 702 may be viewed in which the designer may select any of several standard data types as well as invocation of the "lookup wizard" (a design tool which permits the designer to enter further attributes of a lookup column definition). The "lookup wizard" menu option at reference number 708 is highlighted in inverse video display. The designer completes the selection of the menu option by double clicking the pointer device on the highlighted option.

One of ordinary skill in the art will readily recognize that pop up menu 702 including menu item 708 in the data type column 706 of the design display of FIG. 7 is but one approach for obtaining designer input requesting the definition of a lookup column. Many equivalent user interface techniques may be applied to permit a designer to direct the database application design mode to provide a lookup column definition. For example, standard menu items accessible via a pointer device (mouse) or keyboard are well known to those of ordinary skill in the art.

Figure 8:
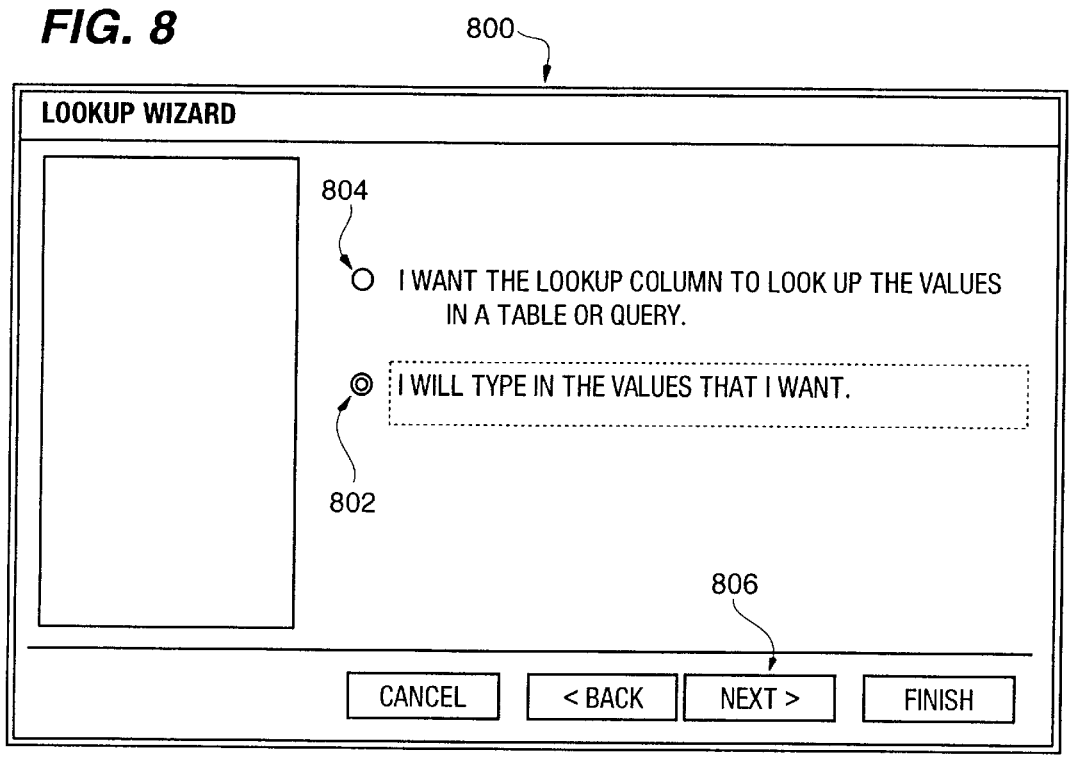

As shown in FIG. 7, the designer invokes the lookup column definition methods of the present invention through user input requesting the definition of the lookup column. When so invoked, element 202 depicted in additional detail in FIG. 4 is operable to obtain all required lookup parameters (also referred to herein as lookup information) from user input. Element 400 of FIG. 4 is therefore first operable to determine whether the designer desires that the lookup column be associated with a static table or a select table. FIG. 8 is an exemplary computer display screen image depicting one method of determining the designer's selection of the lookup column as a static table or a select table in association with a related table or query. As shown in FIG. 8, screen display 800 provides two checkboxes, checkbox 802 indicates if checked that the designer requests the lookup column be associated with a static table, and checkbox 804 indicates if checked that the designer desires the lookup column be associated with a query or select command executed upon a related table or query. The designer may check the appropriate box and then click the next button 806 to proceed to the next stage of processing. Element 400 of FIG. 4 is therefore operable to determine which of checkboxes 802 and 804 have been selected by the designer.

Figure 9:
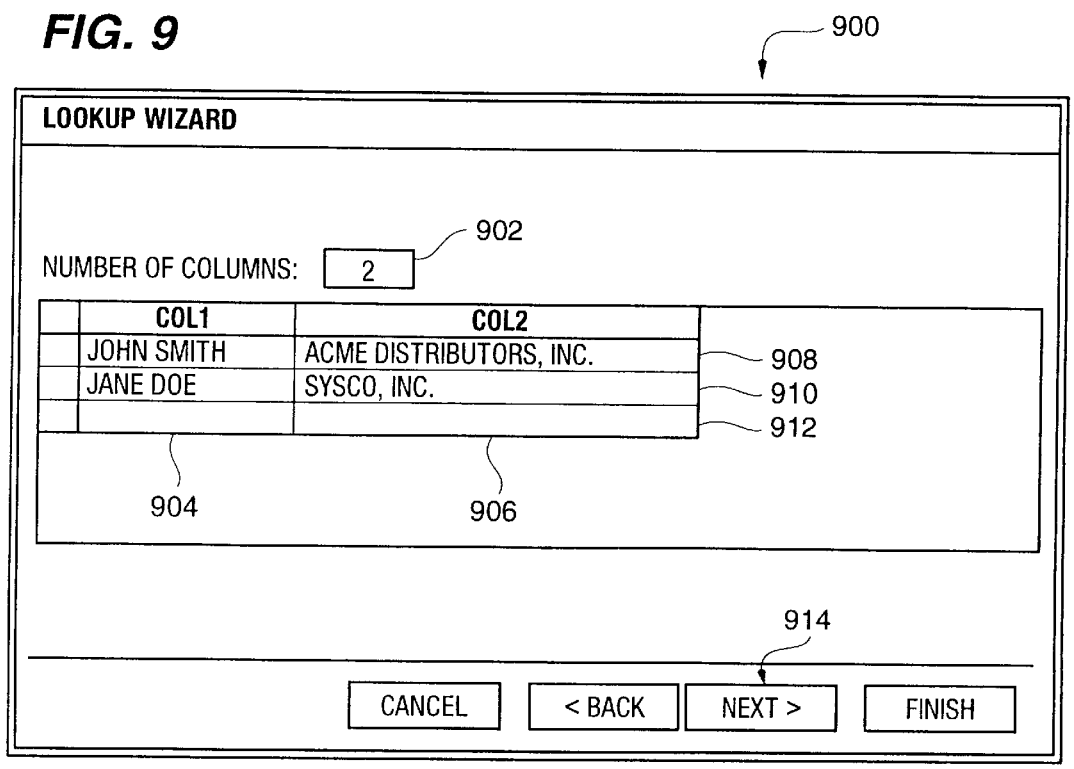

If element 400 determines that the designer has requested the lookup column be associated with a static table, elements 402–406 are next operable to determine additional lookup information (also referred to herein as lookup parameters) required for the definition of the static table values. In particular, elements 402 and 404 are operable to determine the number of alternate value columns to be defined in the static table and the values to be entered in the rows and columns (the cells) of the static column. In particular, element 402 determines the number of columns while element 404 accepts designer input to define the contents of each row in the statically defined table. FIG. 9 is an exemplary computer display screen image showing one possible mode of entry of designer input to determine the number of columns and the contents of rows in the static table. Screen image 900 includes field 902 in which the designer may enter the number of columns to be defined in the static table. Based upon the value entered by the designer in field 902, two columns are displayed as indicated by reference numbers 904 and 906. As shown in screen image 900, the designer has entered two rows of information wherein each row has two values one in each of columns 904 and 906 respectively. The first row 908 has a value in column one 904 of "John Smith" and a value in column two 906 of "Acme Distributors, Inc." The application database designer may enter any number of desired rows in screen 900. Each time a new row is entered, an additional blank row 912 appears on the designers display screen 900.

Element 406 of FIG. 4 is next operable to determine which of the defined columns of the static table is to be designated the "bound column." The "bound column" is the column in the static table which provides the preferred alternative value for storage in the lookup column of the database. For example, the bound column may provide the numeric value to be associated with an identification field thereby achieving the optimizations in reduction of storage capacity required for storing a data value in the lookup column. Other columns (i.e., non-bound columns) therefore provide alternative values which may be more understandable, meaningful, or useful to non-expert users of the application database. As shown in FIG. 10, exemplary computer screen display image 1000 shows all available fields (columns) defined by the designer in the previous screen of FIG. 9. The designer selects the field (column) of the static table which is to be used as the bound column by clicking the pointer device on the desired column. As depicted in FIG. 10, column one is highlighted as indicated by reference number 1002. The designer thereby indicates a desire that column one be used as the bound column. The designer then clicks the next button, 1012, to continue on for further processing of the static table definition for the lookup column of the database table.

Processing then continues with element 416 to complete definition of the lookup column parameters (lookup information) for the static table definition. Operation of element 416 and associated completion of the definition of the lookup information for the static table associated with the lookup column is discussed below as a common function in the definition of either a static table of a select table.

Conversely, if element 400 determines that the designer has requested that the lookup column be associated with a select table, then elements 408–414 are next operable to interact with the designer to thereby determine and generate appropriate lookup information (lookup parameters) for definition of the select table to be associated with the lookup column. As noted above with regard to FIG. 8, the designer may indicate the desire to associate a select table with the lookup column by marking checkbox 804 on screen image 800 of FIG. 8.

As described below, the exemplary screen images used to aid the reader's understanding of the methods of the present invention relate to the example order processing application database presented above with respect to FIG. 6. The example database includes three tables, namely: customer table 600, orders table 602, and employees table 604, and two relations, one between the customers table 600 and the orders table 602 and the second between the employees table 604 and the orders table 602. As noted above, this example database is intended only to aid in understanding the methods of the present invention and is not to be construed to limit the application of the present invention in any manner. One of ordinary skill in the art will readily recognize an infinite number of database applications in which the methods and structures of the present invention may be advantageously applied.

Figure 12:
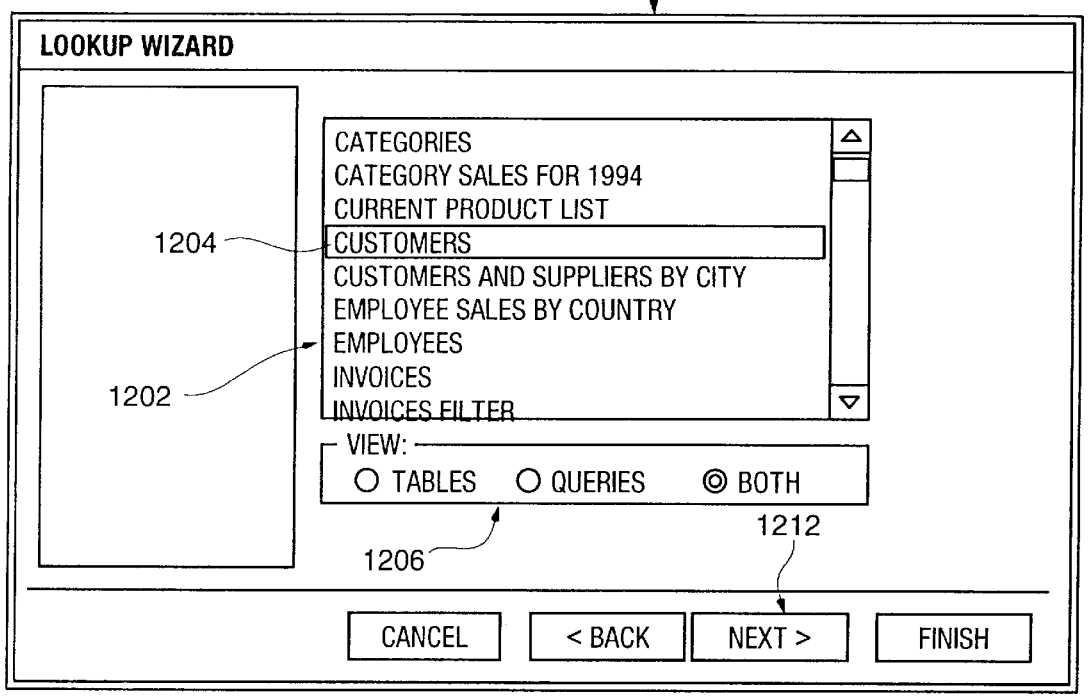

Element 408 is first operable, in response to the designer's desire to associate a select table with the lookup column, to determine from designer input which table or query in the application database (also referred to herein as the second table or query) is to be utilized as the source of records in the select process. The second table or query must be related to the table containing the lookup column being defined. Well known error recovery techniques may be employed to prevent the designer from selecting a second table or query which is not related to the table containing the newly defined lookup column. For example, the designer may be presented only with options to select tables or queries which are related to the lookup column table. FIG. 12 is an exemplary computer screen display image 1200 in which the designer may provide input as to which second table or query is to be used as the source of records for the select table. A list 1202 of all available tables and queries is provided to the designer so that the designer may select a particular table using pointer or keyboard input as well known in the industry. As shown in FIG. 12, both tables and queries available are indicated in the list as provided by checkbox 1206. In the alternative, a designer may request by marking an appropriate checkbox 1206 that only tables are to be viewed in list 1202 or that only queries are to be viewed in list 1202. From list 1202, the designer selects a particular table as indicated by the highlighted customers table 1204. Once the desired second table or query has been highlighted and selected by the designer, the next button 1212 may be used to proceed with further processing and definition of the select table associated with the lookup column being defined.

Element 410 is next operable to determine from designer input which fields of the selected second table are to be used for providing alternate values. At least one field in the selected second table must be selected by the designer to provide the required relationship between the table containing the lookup column and the selected second table or query. One of ordinary skill in the art will readily recognize that a field required to establish the relationship between the lookup column's table and the second table may be automatically included in the list of selected fields regardless of the designer's input. As shown in the screen image 1300 of FIG. 13, a list 1302 of available fields from the selected table or query is provided on one side of the screen image 1300 and a list 1304 of fields selected by the designer is shown on the right side of screen image 1300. The designer identifies particular columns (fields) from the list 1302 of available fields on the left side of screen image 1300, highlights a desired field by clicking the field in the list, and clicks an appropriate button 1306 to move the highlighted available fields from list 1302 to the selected fields list 1304 on the right side of screen image 1300. Other buttons 1306 may be used to modify the list of fields already selected, either adding additional available fields from list 1302 or removing fields from list 1304 previously selected. As indicated in screen image 1300 of FIG. 13, the designer has selected three of the available fields: namely, "Customer I.D.", "CompanyName", and "ContactName." As noted above, the key field "Customer I.D." must be selected to provide the requisite relation between the orders table 602 and the related customers table 600. In this exemplary selection, the designer has requested that the "CompanyName", and the "ContactName" fields are to be utilized in providing alternate values for display and access to the customer ID field of the orders table 602.

Figure 13:
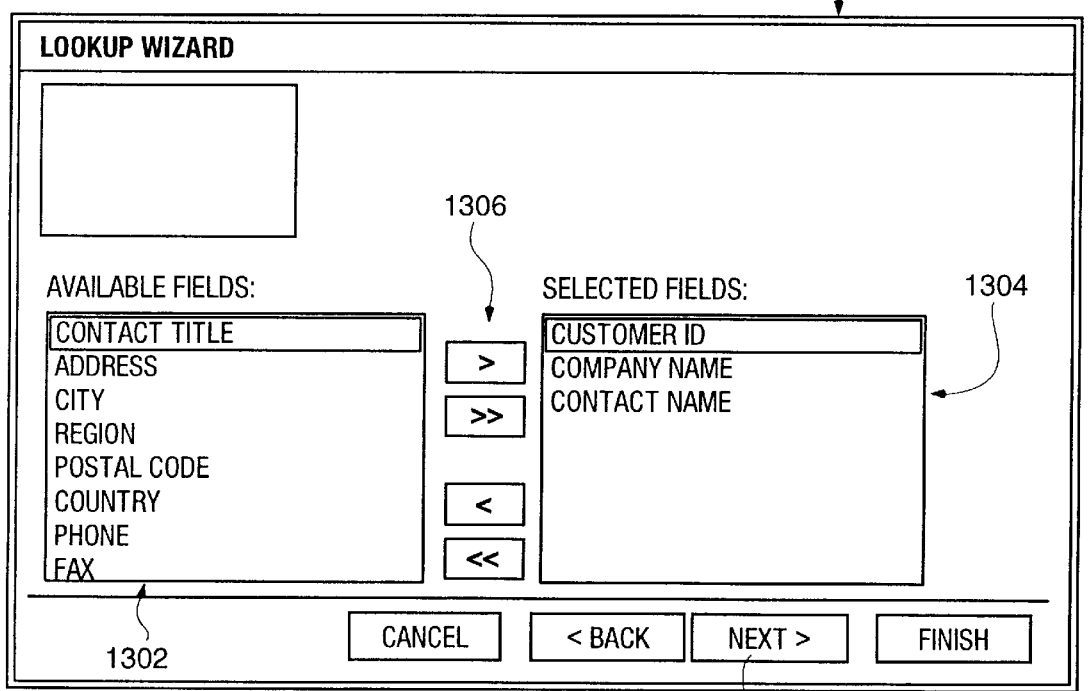

Element 412 is next operable in FIG. 4 to determine from designer input the bound column chosen from among the selected columns depicted in list 1304 of FIG. 13. Normally, the key field which relates the two tables or queries is presumed to be the bound column. In most common situations, the remaining fields of the selected fields list 1304 of FIG. 13 are intended to provide alternate values for more meaningful and useful presentation of data to a non-expert user. The key field associated therewith is used as the bound column for compact storage in the lookup column of the database table. FIG. 15 is an exemplary computer display screen image 1500 depicting the list of selected fields 1502 and permitting the designer to highlight a particular field 1504 to be chosen as the bound column. As shown in FIG. 15, the "CustomerID" field has been selected as the bound column whose value is to be used in storage of the lookup column in the database table. When the designer has identified the desired bound column by highlighting it with the pointer device, next button 1512 is used to proceed on for further processing.

Element 414 is next operable to generate a select or query command to be applied to the second table or query identified by the designer. The select or query command is applied to locate and retrieve rows and columns of the second table defined by designer input above and operation of elements 408–412. Application of the select or query command to the second table produces the result table. The select command corresponding to the above discussed exemplary designer definitions is as follows:

SELECT DISTINCTROW Customers.CustomerID, Customers.CompanyName, Customers.ContactName FROM Customers Whether the designer has defined a static table or a select table, processing now continues with element 416 to determine other lookup parameters which effect the display of alternate values to the application database user. In particular, element 416 is operable to determine the widths of the columns containing alternate values when displayed for data entry on the application database user interface screen. As shown in FIG. 9 with regards to definition of a static table and FIG. 14 with regards to definition of a select table, the designer may adjust the column widths of each of the displayed columns. As is well known in the art, the width of a column may be adjusted by "drag and drop" user interface techniques using the pointer or keyboard for designer input. The designer simply "grabs" the boundary line separating one column from another or the rightmost boundary of the last column then "drags" the boundary line to the desired width position on the display screen. One of ordinary skill in the art will readily recognize other user interface options and methods for defining the display widths of the columns used to present alternate values to the non-expert user.

Element 418 is next operable to permit the designer to modify any of the values and parameters entered for lookup information by operation of elements 402–416 described above. As shown in FIG. 11 with respect to the definition of a static table and FIG. 16 with respect to the definition of a select table, portions of the screen images 1100 and 1600, respectively, permit line oriented data entry by the designer to modify any values and parameters entered above with respect to operation of elements 402–416. The lookup dialog box 1102 and 1602 of FIGS. 11 and 16, respectively, permits the designer to modify the various values entered through operations of elements 402–416. The various entries are defined as follows:

| Lookup Parameter | Purpose/Values |
| --- | --- |
| Display Control | This parameter is set to "Combo Box" to indicate that the associated column is in fact a lookup column. |
| Row Source Type | When set to "Value List" this parameter indicates that the column is associated with a static table of lookup values. When set to "Table/Query" this parameter indicates that the column is associated with a select table. |
| Row Source | If Row Source Type is "Value List" then this parameter supplies the comma separated list of values in the static table (for all columns except the "bound column discussed below). If Row Source Type is "Table/Query" then this parameter supplies the select/query command which generates the select table by application to a second table/query. The second table/query is supplied as part of the select/query command syntax (e.g., an SQL select command). |
| Bound Column | The column number of the Row Source which is the bound column (the column which provides the values to be stored in the lookup column). |
| Column Count | The number of columns in each row supplied by the Row Source. |
| Column Widths | A comma separated list of the width in inches (for display purposes) for each column supplied by Row Source. A width value of zero for a column indicates that the corresponding column is not to be displayed. |
| List Rows | The number of rows to be displayed when the table of alternate values is displayed to a user. Excess rows are available for viewing through use of scroll bars as is well known in the art. |
| List Width | Total width of the table of alternate values when displayed for user input. If the sum of the column widths exceeds the List Width value, then extra values are viewable through horizontal scroll bars as is well known in the art. |
| Limit to List | This boolean parameter indicates, if TRUE (e.g., set to yes), that only values from the table of alternate values may be selected by the user to modify the value stored in the lookup column. Otherwise1 alternate values not found in the table of alternate values may be entered into the lookup column for storage. |

One of ordinary skill in the art will readily recognize that a designer may maintain or modify the lookup information by directly accessing the information described above through the lookup dialog box as shown in FIGS. 11 and 16. Once a lookup column has been defined as discussed above with respect to elements 400–416, the designer may at any later time modify and maintain that information by directly invoking operation of element 418 to modify information in the lookup dialog box.

As noted above, element 414 is operable to automatically generate an appropriate select or query command to be used in generating the alternative values for a select table. In addition, as noted above, element 418 is operable to permit a designer to modify any lookup information values and parameters initially generated by operation of elements 400–416. In particular the row source parameter corresponding to a designer's request to generate a select table may be modified by invoking any standard, well known, query generation or query builder function to generate or modify the select query command initially created by operation of element 414. In particular, this feature of the present invention enables significant flexibility in the designer's generation, creation, and modification of select or query commands as part of the definition of a select table in association with a lookup column of a database table.

Methods of the Present Invention—Lookup Column Access

Figure 3:
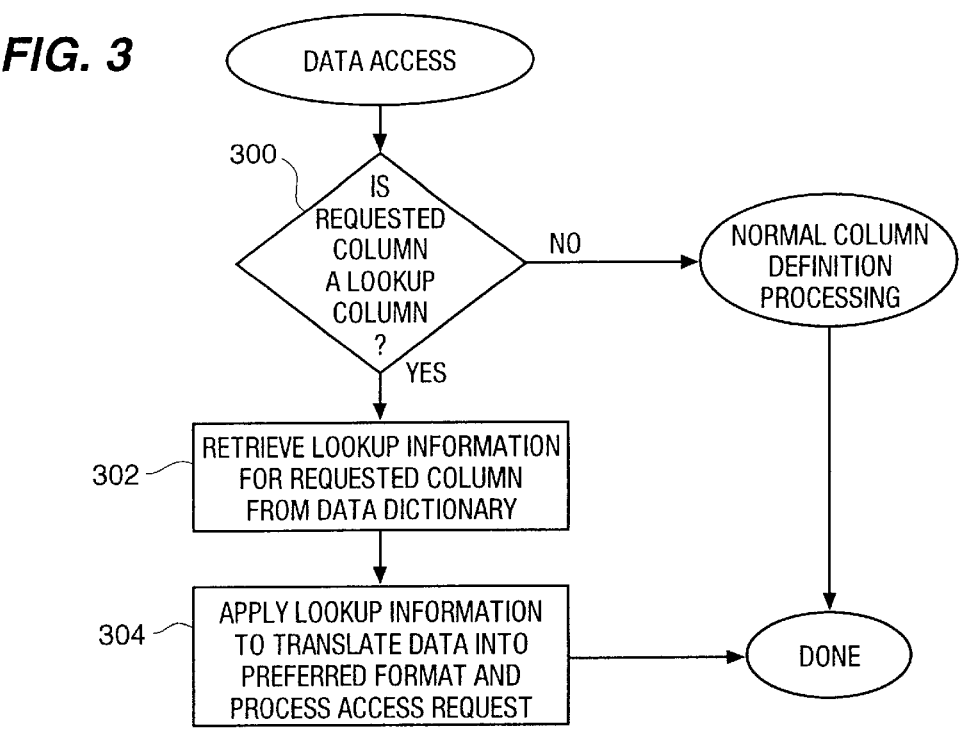

FIG. 3 is a flowchart generally describing the operation of the present invention to utilize lookup information stored in the data dictionary in association with a lookup column of an application database. The method depicted in FIG. 3 represents a portion of the processing performed by a database management subsystem (also referred to herein as DBMS) in response to a user's request to access data stored in a lookup column. Element 300 is first operable to determine whether the request is for access to a column of a table which has been defined as a lookup column. If the requested column is not a lookup column, normal processing proceeds to termination for access to the requested column of data of the selected table. If however, the data access request is to a column which has been defined as a lookup column as noted above with respect to FIGS. 2 and 4, element 302 is next operable to retrieve the lookup information associated with the lookup column in the data dictionary of the application database.

Element 304 is then operable to apply the retrieved lookup information to the translation of data in the lookup column. The particular data access may be either for read access or for modification access to the data stored in the lookup column. In both cases, the lookup information is used to translate between the data format used for storage in the lookup column (e.g., the format and type of the bound column data) and the format of the alternate values preferred for presentation of data to users. In the case of read access requested by a user (e.g., to view the data on a computer display form or a report), the data stored in the lookup column is retrieved and returned to the user in the form of alternate values supplied through reference to the lookup information. In the case of modification access to the lookup column data (e.g., to modify the data stored as viewed on a display screen image), the data provided by the users access request, typically in the format of an alternate value, is translated for storage in the lookup column into the format of the bound column information.

Figure 5:
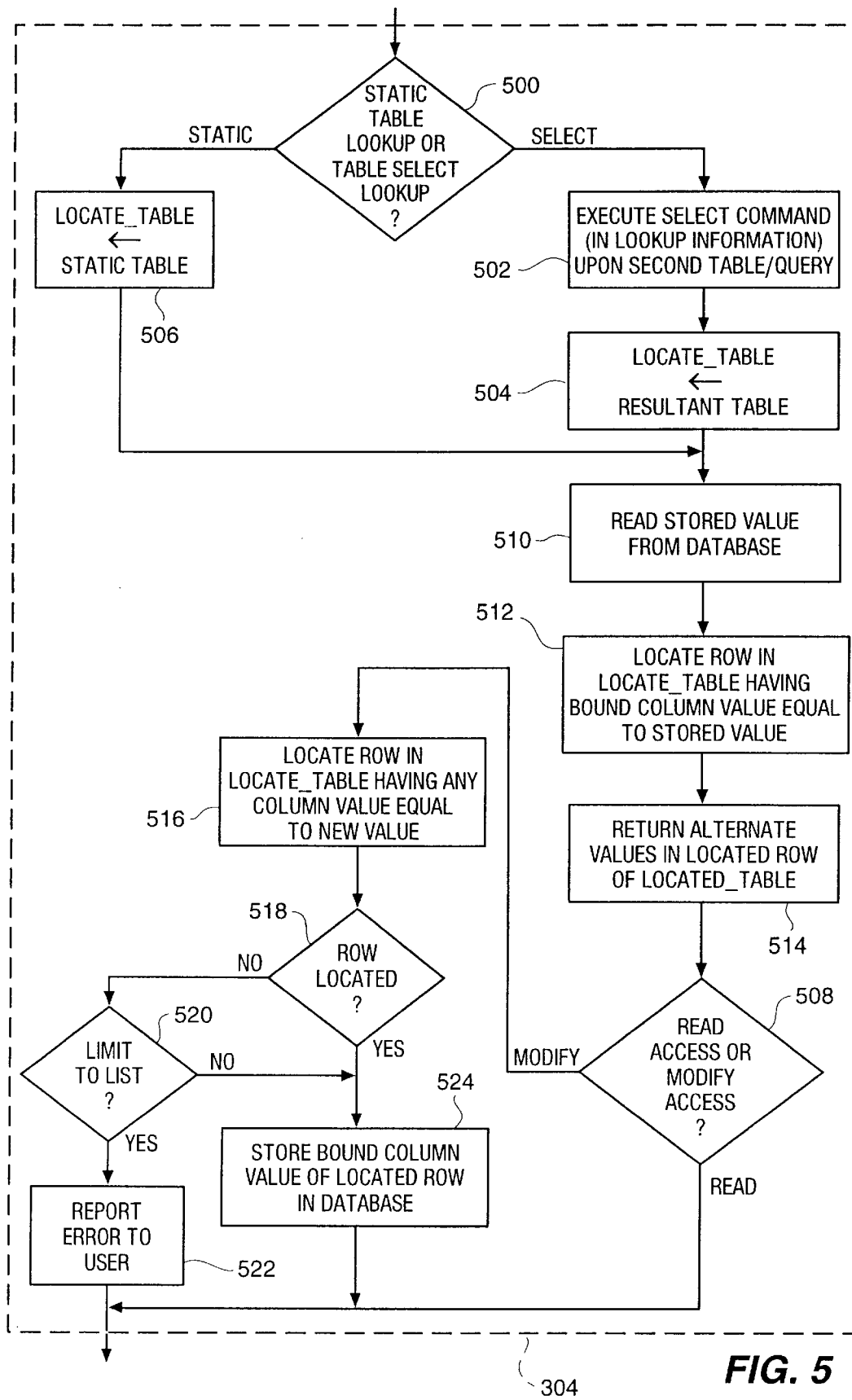

FIG. 5 in conjunction with FIG. 17 provides additional information regarding the detailed operation of element 304 of FIG. 3 described above. Element 304 is operable to apply the lookup information retrieved from the data dictionary to properly translate between the stored lookup column format (e.g., the format of the bound column) and the preferred alternate value formats for user presentation of data. Specifically, FIG. 5 is a flowchart describing the additional details of the operation of element 304 while FIG. 17 is an exemplary computer display screen image showing an example of presentation of alternate values in conjunction with read and/or modify access to a lookup column.

Element 500 of FIG. 5 is first operable to determine whether the particular lookup column is associated with a static table or a select table. If the lookup column is associated with a static table, element 506 is next operable to set a local pointer variable to point at the static table stored in the lookup information portion of the data dictionary associated with the application database. If element 500 determines that the lookup column is associated with a select table, elements 502–504 are next operable to execute the select or query command defined in the lookup information and thereby extract records from the second table or query. A pointer to the resultant table extracted from the second table or query by application of the select command by element 502 is stored in the local pointer variable for further processing by operation of element 504.

If the lookup information indicates a static table lookup, then the local pointer variable points to the static table information. Otherwise, the local pointer variable points to the result table generated by application of the defined select or query command to the identified second table or query. In both the case of a static table lookup and a select table lookup, processing then continues with element 510.

In case of either a static table lookup column access and a select table lookup column access, elements 510–514 are next operable to appropriately translate data from the stored format of the bound column into the preferred alternate formats for presentation to the user. In particular, element 510 is first operable to read the stored value from the lookup column of the database table. Element 512 is then operable to locate a row in the table pointed to by the locate table pointer variable which has a bound column value equal to the stored value read from the lookup column of the database table. Element 514 is then operable to return the alternate values from additional columns of the row located by operation of element 512. Well known error recovery techniques may be invoked if the stored value retrieved is not associated with an equivalent alternate value as determined by operation of element 512.

Element 508 next determines whether the users request was for modify access to the lookup column. If the user has not requested modification of the lookup column value, then processing of element 304 of FIG. 5 is complete with respect to a user's read access request. If the user requests modification of the lookup column value, elements 516–524 are operable to process the user's modification request using the alternate values located and returned from the lookup column read access of elements 510–514. In particular, element 516 is operable to locate a row in the table pointed to by the local table pointer variable which has any column value equal to the newly supplied value in the users modification request. A user may specify the new data in the modification access request in the format and type of the alternate values defined by the lookup information. Operation of element 516 therefore locates the row in the table pointed to by the local table pointer variable for which any of the column values, (the bound column or any of the alternate value columns), is equal to the supplied value in the user's modification request. Element 518 is next operable to determine whether such a row was so located by operation of element 516. If no such row is located, element 520 is next operable to determine whether the designers lookup information supplied by operation of the methods of FIG. 4 as discussed above, requires that any new value to be stored in the lookup column appear in the lookup information table of alternate values. If such a requirement was specified by the designer, element 522 is then operable to report an error condition to the user thereby completing processing of the user's modification request. Otherwise, element 524 is next operable to store the bound column value of the row located by operation of element 516 into the appropriate row of the lookup column of the table in the application database.

FIG. 17 is an exemplary computer display screen image 1700 which aids in understanding the processing of the flowchart of FIG. 5. As shown in the exemplary screen displays of FIG. 17 and FIG. 19 as discussed above, the orders table 602 is displayed in tabular form for presentation of information to the user. Both the customer column 1900 and the employee column 1902 are presented to the user with alternate values displayed. These alternate values provide more meaningful information to a typical user of the application database. The underlying customer column and employee column of orders table 602 store the values of the bound columns in each of the respective lookup column definition. As described above with respect to FIG. 19, such a display of table 602 exemplifies a user's read access to the underlying orders table 602. As discussed above with respect to FIG. 5, the data presented in the customers column 1900 is therefore translated from the underlying bound column value into the company name textual value by operation of element 514 of FIG. 5 as discussed above. In addition, exemplary screen image 1700 of FIG. 17 shows pull down menu 1702 corresponding to alternate values presented in a tabular form for the user's selection of a new value to be inserted in a row of table 602. In particular, the user selects the customer field to be modified as shown in FIG. 17 by the highlighted customer field in the first row of table 602 and as indicated by reference number 1706. Pull down menu 1702 is then displayed to provide the user with a list of alternate value selections. The user then selects the new value to be placed in the highlighted customer column 1706. As shown in FIG. 17, the user has highlighted new alternate value in the fifth row indicated by reference number 1704 in pull down menu 1702. The highlighted row of the pull down menu indicates that a new customer identified by the company name "Wellington Importadora" having a contact name of "Paula Parente" is to replace the currently stored customer having a customer company name of "Vins et alcools Chevalier." When the user completes the selection of row 1704 of pull down menu 1702 (e.g., by double clicking the highlighted row at 1704) the bound column value equivalent to the highlighted company name shown on row 1704 is stored in the first row of the orders table 602 of the application database.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A computer operable method for maintaining display parameters associated with a lookup column of a database table comprising the steps of:

receiving user input indicative of at least one display parameter which identifies at least one alternate value associated with a lookup field of said lookup column of said database table;

storing said at least one display parameter in a data dictionary associated with said database table;

retrieving, responsive to access to said lookup column of said database, said display parameter from said data dictionary; and applying said retrieved display parameter to present data corresponding to said lookup column of said database.

2. The method of claim 1 wherein the receiving step includes the step of:

receiving user input indicative of a table of rows each including an alternate display value to be associated with said lookup column of said database table.

3. The method of claim 2 wherein each of said rows includes an alternate display value list comprising a plurality of equivalent values associated with each of said alternate display value.

4. The method of claim 3 wherein the receiving step includes the step of:

receiving user input indicative that a particular value is to be stored in the associated column of said database table wherein said particular value is selected from the group consisting of said alternate display value and said alternate display value list.

5. The method of claim 1 wherein the receiving step includes the steps of:

receiving user input indicative of a second database table to be joined with said database table; and receiving user input indicative of a query command to be applied to said second database table to select at least one alternate display value associated with said column of said database table.

6. The method of claim 5 wherein said query command is operable to select a plurality of equivalent alternate display values.

7. The method of claim 6 wherein the receiving step includes the step of:

receiving user input which indicates that a particular one of said plurality of equivalent alternate display values is to be stored in the associated column of said database table.

8. The method of claim 1 wherein the step of applying includes:

displaying alternate display values for said lookup column of said database table.

9. A computer operable method for maintaining display parameters associated with a lookup column of a database table comprising the steps of:

receiving user input indicative of parameters associated with a lookup field of said lookup column of said database table;

generating said display parameters from said parameters, said display parameters identify at least one alternate value for said lookup field of said lookup column;

storing said display parameters in a data dictionary associated with said database table;

retrieving said display parameters in response to a user request to access said lookup column of said database table; and utilizing said alternate value to present data in said lookup column in response to said user request.

10. The method of claim 9 wherein the receiving step includes the step of:

receiving user input indicative of a list of entries each including at least one alternate display value to be associated with said lookup column of said database table.

11. The method of claim 10 wherein each of said entries including an alternate display value comprises a plurality of equivalent values associated with each of said alternate display values.

12. The method of claim 11 wherein the receiving step includes the step of:

receiving user input indicative that one of said plurality of equivalent values of said each of said entries is to be stored in the associated column of said database table.

13. The method of claim 9 wherein the receiving step includes the steps of:

receiving user input indicative of a second database table to be joined with said database table; and receiving user input indicative of a query command to be applied to said second database table to select at least one alternate display value associated with said column of said database table.

14. The method of claim 13 wherein said query command is operable to select a plurality of equivalent alternate display values.

15. The method of claim 14 wherein the receiving step includes the step of:

receiving user input indicative that a particular one of said plurality of equivalent alternate display values is to be stored in the associated column of said database table.

16. A computer operable method for presenting at least one alternate value associated with data stored in a column of a database table comprising the steps of:

retrieving, in response to a user query that accesses said data of said column of said database table, display parameters associated with said column of said database table, said display parameters includes a list of entries each including at least one alternate display value to be associated with said column of said database table;

determining, from said display parameters, at least one alternate value associated with said data stored in said column of said database table; and presenting a result of said user query wherein said at least one alternate value is presented to the requesting user.

17. The method of claim 16 wherein each of said entries including an alternate display value comprises a plurality of equivalent values associated with each of said alternate display values.

18. The method of claim 16 wherein said display parameters includes:

a first data object indicative of a second database table to be joined with said database table; and a second data object indicative of a query command to be applied to said second database table to select at least one alternate display value associated with said column of said database table.

19. The method of claim 18 wherein said query command is operable to select a plurality of equivalent alternate display values.

20. A program storage device readable by a computer, tangibly embodying a program or instructions executable by the computer to perform the method steps maintaining display parameters associated with a lookup column of a database table, said method steps comprising:

receiving user input indicative of at least one display parameter which identifies at least one alternate value associated with a lookup field of said lookup column of said database table;

storing said at least one display parameter in a data dictionary associated with said database table;

retrieving, responsive to access to said lookup column of said database, said display parameter from said data dictionary; and applying said retrieved display parameter to present data corresponding to said lookup column of said database.

21. The program storage device of claim 20 wherein the receiving step includes the step of:

receiving user input indicative of a list of entries each including at least one alternate display value to be associated with said lookup column of said database table.

22. The program storage device of claim 21 wherein each of said entries including an alternate display value comprises a plurality of equivalent values associated with each of said alternate display values.

23. The program storage device of claim 22 wherein the receiving step includes the step of:

receiving user input indicative that a the alternate display value in a particular one of said plurality of equivalent values of said each of said entries is to be stored in the associated column of said database table.

24. The program storage device of claim 20 wherein the receiving step includes the steps of:

receiving user input indicative of a second database table to be joined with said database table; and receiving user input indicative of a query command to be applied to said second database table to select at least one alternate display value associated with said column of said database table.

25. The program storage device of claim 24 wherein said query command is operable to select a plurality of equivalent alternate display values.

26. The program storage device of claim 25 wherein the receiving step includes the step of:

receiving user input indicative that a particular one of said plurality of equivalent alternate display values is to be stored in the associated column of said database table.

27. The program storage device of claim 20 wherein the step of applying includes:

displaying alternate display values for the column of said database table.

28. A program storage device readable by a computer, tangibly embodying a program or instructions executable by the computer to perform the method steps for maintaining display parameters which identify parameters used in the display of alternate values associated with a lookup column of a database table, said method steps comprising:

receiving user input indicative of parameters associated with a lookup field of said lookup column of said database table;

generating said display parameters from said parameters, said display parameters identify at least one alternate value for said lookup field of said lookup column;

storing said display parameters in a data dictionary associated with said database table;

retrieving said display parameters in response to a user request to access said lookup column of said database table; and utilizing said alternate value to present data in said lookup column in response to said user request.

29. The program storage device of claim 28 wherein the receiving step includes the step of:

receiving user input indicative of a list of entries each including at least one alternate display value to be associated with said lookup column of said database table.

30. The program storage device of claim 29 wherein each of said entries including an alternate display value comprises a plurality of equivalent values associated with each of said alternate display values.

31. The program storage device of claim 30 wherein the receiving step includes the step of:

receiving user input indicative that a the alternate display value in a particular one of said plurality of equivalent values of said each of said entries is to be stored in the associated column of said database table.

32. The program storage device of claim 28 wherein the receiving step includes the steps of:

receiving user input indicative of a second database table to be joined with said database table; and receiving user input indicative of a query command to be applied to said second database table to select at least one alternate display value associated with said column of said database table.

33. The program storage device of claim 32 wherein said query command is operable to select a plurality of equivalent alternate display values.

34. The program storage device of claim 33 wherein the receiving step includes the step of:

receiving user input indicative that a particular one of said plurality of equivalent alternate display values is to be stored in the associated column of said database table.

35. A program storage device readable by a computer, tangibly embodying a program or instructions executable by the computer to perform the method steps for presenting at least one alternate value associated with data stored in a column of a database table, said method steps comprising:

retrieving, in response to a user query that accesses said data of said column of said database table, display parameters associated with said column of said database table, said display parameters includes a list of entries each including at least one alternate display value to be associated with said column of said database table;

determining, from said display parameters, at least one alternate value associated with said data stored in said column of said database table; and presenting a result of said user query wherein said at least one alternate value is presented to the requesting user.

36. The program storage device of claim 35 wherein each of said entries including an alternate display value comprises a plurality of equivalent values associated with each of said alternate display values.

37. The program storage device of claim 35 wherein said display parameters includes:

a first data object indicative of a second database table to be joined with said database table; and a second data object indicative of a query command to be applied to said second database table to select at least one alternate display value associated with said column of said database table.

38. The program storage device of claim 37 wherein said query command is operable to select a plurality of equivalent alternate display values.

* * * * *

UNITED STATES PATENT AND TRADEMARK OFFICE
CERTIFICATE OF CORRECTION

PATENT NO. : 5,826,257

DATED : October 20, 1998

INVENTOR(S) : George Arthur Snelling, Jr.

It is certified that error appears in the above-identified patent and that said Letters Patent is hereby corrected as shown below:

Column 8, Line 61, replace "designers" with --designer's--

Column 12, Line 16, replace "altemate" with --alternate--

Column 12, Line 27, replace "Otherwis1" with -Otherwise,--

Column 13, Line 23, replace "users" with --user's--

Column 14, Line 10, replace "users" with --user's--

Column 14, Line 21, replace "users" with --user's--

Column 14, Line 32, replace "designers" with --designer's--

Signed and Sealed this

Sixteenth Day of February, 1999

Attest:

*Attesting Officer*

*Acting Commissioner of Patents and Trademarks*